(12) United States Patent
Suzuki et al.

(10) Patent No.: US 7,011,114 B2
(45) Date of Patent: Mar. 14, 2006

(54) AUTOMOTIVE FUEL HOSE

(75) Inventors: Junichiro Suzuki, Kasugai (JP); Kazutaka Katayama, Kasugai (JP); Hiroaki Ito, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 6 days.

(21) Appl. No.: 10/901,025

(22) Filed: Jul. 29, 2004

(65) Prior Publication Data

US 2005/0067035 A1  Mar. 31, 2005

(30) Foreign Application Priority Data

Sep. 30, 2003  (JP) .............................. 2003-340663
Jul. 26, 2004  (JP) .............................. 2004-217914

(51) Int. Cl.
*F16L 11/00* (2006.01)

(52) U.S. Cl. .................... 138/137; 138/140; 428/36.91

(58) Field of Classification Search ................ 138/137, 138/140, DIG. 7; 428/36.91, 36.9
See application file for complete search history.

(56) References Cited

U.S. PATENT DOCUMENTS 6,176,268 B1 * 1/2001 Hsich et al. ................. 138/137
6,263,920 B1 * 7/2001 Hsich et al. ................. 138/137
6,446,673 B1 * 9/2002 Iio et al. ...................... 138/137
6,491,994 B1 * 12/2002 Kito et al. .................. 428/36.5
6,604,551 B1 * 8/2003 Nishi et al. ................. 138/137
6,655,414 B1 * 12/2003 Nishi et al. ................. 138/137
6,689,440 B1 * 2/2004 Hsich et al. ............. 428/36.91
6,855,787 B1 * 2/2005 Funaki et al. ............... 526/250
6,945,279 B1 * 9/2005 Baba et al. .................. 138/137
2002/0134450 A1 * 9/2002 Iio et al. ...................... 138/137
2004/0040608 A1 * 3/2004 Ito et al. ...................... 138/137
2005/0189030 A1 * 9/2005 Katayama et al. .......... 138/137

FOREIGN PATENT DOCUMENTS

EP   0478249 A2   4/1992
EP   1044806 A2   10/2000
JP   10-138372    5/1998

* cited by examiner

Primary Examiner—Patrick Brinson
(74) Attorney, Agent, or Firm—Armstrong, Kratz, Quintos, Hanson & Brooks, LLP

(57) ABSTRACT

An automotive fuel hose having a three-layer structure excellent in sour-gasoline resistance and impact resistance. The automotive fuel hose includes a tubular inner layer in which fuel is adapted to flow; a low fuel permeability layer provided on an outer peripheral surface of the inner layer; and an outer layer provided on an outer peripheral surface of the low fuel permeability layer. The inner layer and the outer layer each including at least one of a polyolefin resin having a functional group and a polyamide resin and the low fuel permeability layer including a polyphenylene sulfide resin.

11 Claims, 1 Drawing Sheet

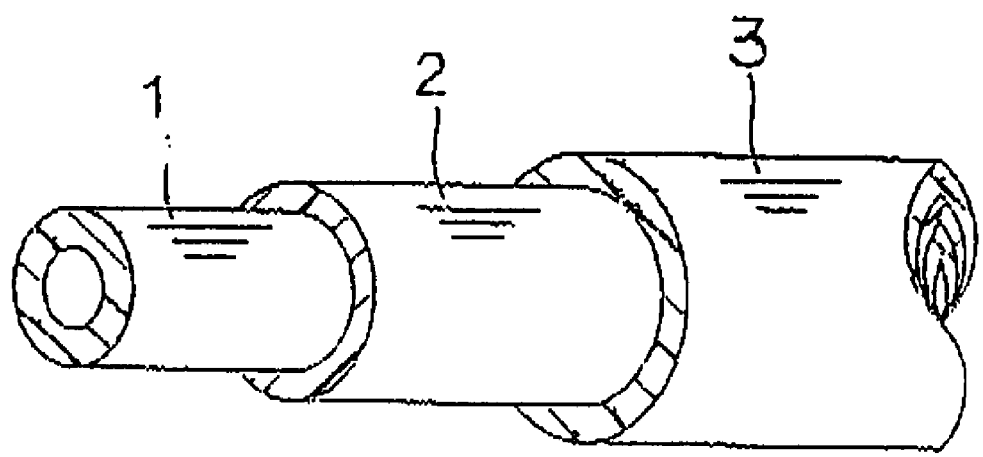
Figure

AUTOMOTIVE FUEL HOSE

BACKGROUND OF THE INVENTION

1. Field of the Invention

The present invention relates to an automotive fuel hose for transportation of an automotive fuel, and, more specifically, to an automotive fuel hose for transportation of gasoline, alcohol-containing gasoline, diesel fuel or the like.

2. Description of the Art

With growing worldwide awareness of environmental issues, the control of the amount of hydrocarbon vapor emission from an automotive fuel hose has been enhanced. Particularly in the United States, stringent regulations against vapor emission have recently come into effect. To cope with the hydrocarbon vapor emission control in this situation, multi-layer hoses have been proposed which include a layer having low fuel permeability composed of a fluororesin.

Such a multi-layer hose including a fluororesin layer has a relatively low permeability against gasoline containing alcohol such as methanol and ethanol. To satisfy a stricter low-permeability requirement, the thickness of a fluororesin layer should be increased, resulting in correspondingly higher costs.

Then, a polyphenylene sulfide (PBS) resin is focused upon because the PPS resin has higher permeation resistance than the fluororesins. For this reason, the PPS resin has a sufficient permeation resistance even if it has a relatively thin thickness. Thus, the PPS resin is advantageously used in terms of costs compared with the hose in which the low fuel permeability layer is composed of fluororesins. As a hose including a low fuel permeability layer comprising a PPS resin, for example, a multi-layer fuel tube including an inner layer (low fuel permeability layer) comprising a PPS resin and an outer layer, provided on an outer peripheral surface of the inner layer, comprising a thermoplastic resin other than the PPS resin was proposed (see Japanese Unexamined Patent Publication No. 10-138372 (1998)).

However, the multi-layer tube, as proposed in the above-mentioned publication, is inferior in resistance to sour gasoline which is the result of oxidation of gasoline and is inferior in impact resistance due to the following reasons since the inner layer in direct contact with fuel is made of a PPS resin.

In view of the foregoing, it is an object of the present invention to provide an automotive fuel hose excellent in sour-gasoline resistance and impact resistance.

SUMMARY OF THE INVENTION

In accordance with the present invention to achieve the aforesaid object, there is provided an automotive fuel hose having a three-layer structure which comprises: a tubular inner layer in which fuel is adapted to flow; a low fuel permeability layer formed on an outer peripheral surface of the inner layer; and an outer layer formed on an outer peripheral surface of the low fuel permeability layer, the inner layer and the outer layer each comprising at least one of a polyolefin resin having a functional group and a polyamide resin and the low fuel permeability layer comprising a polyphenylene sulfide resin.

The inventors of the present invention conducted intensive studies to discover why the multi-layer fuel tube, as mentioned above, is inferior in sour gasoline resistance. They reached the conclusion that when a PPS resin is used as a material for the inner layer, the PPS resin is oxidized and modified due to sour gasoline, so that crystallinity of the PPS resin is reduced and low fuel permeability, intrinsic property of the PPS resin, is lost, resulting in inferior sour gasoline resistance. Further, they found that the multi-layer fuel tube, as mentioned above, is inferior in impact resistance because an inner layer comprising a PPS resin is not covered so as to be exposed. As a result of their continued studies for solving these problems, they discovered that the aforesaid object could be achieved by forming a low fuel permeability layer by using a PPS resin, sandwiching the thus obtained low fuel permeability layer in between an inner layer and an outer layer for forming a sandwich structure, and forming the inner layer and the outer layer by using at a least of one of a polyolefin resin having a functional group and a polyamide resin. Thus, they attained the present invention. That is, when an inner layer is formed by using a specific material on an inner peripheral surface of the low fuel permeability layer comprising a PPS resin, the PPS resin is not in contact with sour gasoline directly so that superior sour gasoline resistance can be obtained with retaining the low fuel permeability originated from the PPS resin. Further, when forming a sandwich structure by sandwiching the low fuel permeability layer formed by the PPS resin in between the inner layer and the outer layer, both which are formed by a specific material, superior impact resistance can be obtained.

According to the inventive automotive fuel hose, an inner layer is formed by using a specific material on an inner peripheral surface of a low fuel permeability layer formed of a PPS resin. For this reason, the PPS resin does not contact sour gasoline directly so that the low fuel permeability property of the PPS resin can be retained and also excellent sour gasoline resistance can be obtained. Further, since the inventive hose has a sandwich structure by sandwiching the low fuel permeability layer in between the inner layer and the outer layer, both which are formed by a specific material, the inventive hose has superior impact resistance.

Further, when forming a low fuel permeability layer by using an organic compound having a functional group together with the PPS resin, adhesion is improved between the inner layer and the low fuel permeability layer and also between the low fuel permeability layer and the outer layer. Therefore, interlayer adhesion of the entire hose is improved and also impact resistance is improved.

When the functional group contained in the PPS resin or the functional group contained in fluororesin is a specific functional group, interlayer adhesion is improved and also impact resistance is improved.

Since a vinylidene fluoride-chlorotrifluoroethylene copolymer and an ethylene-tetrafluoroethylene-hexafluoropropylene copolymer having a functional group are superior in flexibility, bending formability can be improved. Further, each fluororesin selected from the group consisting of a tetrafluoroethylene-hexafluoropropylene copolymer (FEP) having a functional group, a vinylidene fluoride-tetrafluoroethylene-hexafluoropropylene copolymer (THV) having a functional group, a tetrafluoroethylene-perfluoroalkylvinyl ether copolymer (PFA) having a functional group, a tetrafluoroethylene-hexafluoropropylene-perfluoroalkylvinyl ether copolymer having a functional group and an ethylene-tetrafluoroethylene-hexafluoropropylene-perfluoroalkylvinyl ether copolymer having a functional group, has a high fluorine content, so that it is flexible and has low fuel permeability. Therefore, when forming an innermost layer by using at least one copolymer selected from the above-mentioned group, barrier properties are improved. For this reason, it is possible to thin the low fuel permeability layer to be within a scope which does not affect barrier properties. As a result, bending strength is further reduced and bending formability is improved.

BRIEF DESCRIPTION OF THE DRAWING

The sole FIGURE of the drawing is a diagram illustrating the construction of an exemplary automotive fuel hose according to the present invention.

DESCRIPTION OF THE PREFERRED EMBODIMENTS

Embodiments of the present invention will hereinafter be described in detail.

As shown in the FIGURE, an automotive fuel hose according to one embodiment of the present invention includes a tubular inner layer 1 in which fuel is circulated, a low fuel permeability layer 2 provided on an outer peripheral surface of the inner layer 1, and an outer layer 3 provided on an outer peripheral surface of the low fuel permeability layer.

The inner layer 1 and the outer layer 3 are formed by using at least one of a polyolefin resin having a functional group and a polyamide resin (component A), and the low fuel permeability layer 2 is formed by using a polyphenylene sulfide resin (component B), and the low fuel permeability layer is sandwiched in between the inner layer and the outer layer for forming a sandwich structure, which is the main feature of the present invention.

At least one of the polyolefin resin having a functional group and the polyamide resin (component A) is used as the material for forming the inner layer 1.

The polyamide resin is not specifically limited. Examples thereof include polyamide 6 (PA6), polyamide 66 (PA66), polyamide 99 (PA99), polyamide 610 (PA610), polyamide 612 (PA612), polyamide 11 (PA11), polyamide 912 (PA912), polyamide 12 (PA12), a copolymer of polyamide 6 and polyamide 66 (PA6/PA66) and a copolymer of polyamide 6 and polyamide 12 (PA6/PA12), which may be used either alone or in combination.

The polyamide resin may be modified by a functional group such as an epoxy group, a hydroxyl group, a carboxylic anhydride residual group, a carboxylic acid group, an acrylate group, a carbonate group and an amino group. As such a modified polyamide resin, those which have many terminal amino groups are preferred, and those which have more terminal amino groups than terminal carboxyl groups are particularly preferred.

The polyolefin resin having a functional group is not specifically limited. Examples thereof include polypropylene (PP), polyethylene, polybutene and polymethylpentene, which may be used either alone or in combination. Among them, polypropylene (PP) is preferred in terms of heat resistance and easy availability.

The functional group contained in the polyolefin resin is not specifically limited, however, preferable examples thereof include an epoxy group, a hydroxyl group, a carboxylic anhydride residual group, a carboxylic acid group, an acrylate group, a carbonate group and an amino group.

Further, an electrically conductive material such as carbon black, carbon nanotubes, metal fiber, metal powder or metal oxide powder may be blended in the at least one of the polyolefin resin having a functional group and the polyamide resin (component A), as the material for the inner layer 1. When the inner layer 1 is thus imparted with electrical conductivity, the inner layer preferably has a surface electric resistance of not higher than $10^8$ Ω sq, particularly preferably not higher than $10^7$ Ω sq. The proportion of the electrically conductive material is preferably determined so that the surface electrical resistance of the inner layer 1 falls within the aforesaid range.

One or more of an organic compound having a functional group, impact modifier, plasticizer may be blended, as required, in the at least one of the polyolefin resin having a functional group and the polyamide resin (component A), as the material for the inner layer 1.

The organic compound having a functional group is not specifically limited, however, examples thereof include ethylene-glycidyl methacrylate copolymer (EGMA), modified EGMA, an ethylene-glycidyl methacrylate-vinyl acetate copolymer, an ethylene-glycidyl methacrylate-methyl acrylate copolymer, an ethylene-methyl acrylate copolymer, an ethylene-methyl acrylate-acrylate copolymer, an ethylene-ethyl acrylate copolymer (EEA), modified EEA, a modified ethylene-ethyl acrylate-maleic anhydride copolymer, an ethylene-methacrylate copolymer, acrylic rubber, an ethylene-vinyl acetate copolymer (EVA), modified EVA, modified polypropylene (PP), modified polyethylene (PE), an ethylene-ester acrylate-maleic anhydride copolymer, an epoxidized styrene-butadiene-styrene block copolymer (SBS), an epoxidized styrene-ethylene-butadiene-styrene block copolymer (SEBS), acid-modified SBS, acid-modified SEBS, a styrene-isobutylene-styrene block copolymer (SIBS), a styrene-isopropenyl oxazoline copolymer, a styrene-acrylonitrile-isopropenyl oxazoline copolymer, a thermoplastic urethane, a thermoplastic elastomer, a polyamide resin, a polyester resin, ε-caprolactam, ω-amino undecanoic acid, ω-amino dodecanoic acid and ω-laurolactam, which may be used either alone or in combination.

Examples of the modified EGMA include, for example, those which are obtained by grafting polystyrene (PS), polymethyl methacrylate (PMMA), an acrylonitrile-styrene copolymer (AS), a copolymer of methyl methacrylate (MMA) and butyl acrylate, or the like, to EGMA.

Examples of the modified EEA include, for example, those which are obtained by grafting PS, PMMA, AS, a copolymer of MMA and butyl acrylate, or the like, to EEA; maleic anhydride modified EEA; and silane modified EEA.

Examples of the modified ethylene-ethyl acrylate-maleic anhydride copolymer include, for example, those which are obtained by grafting PS, PMMA, AS, a copolymer of MMA and butyl acrylate, or the like, to ethylene-ethyl acrylate-maleic anhydride copolymer.

Examples of the modified EVA include, for example, those which are obtained by grafting PS, PMMA, AS, a copolymer of MMA and butyl acrylate, or the like, to EVA.

Examples of the modified PP include, for example, those which are obtained by grafting PS or AS to PP, and maleic anhydride modified PP.

Examples of the modified PE include, for example, those which are obtained by grafting PS, PMMA, AS, a copolymer of MMA and butyl acrylate, or the like, to low-density polyethylene (LDPE), and maleic anhydride modified PE.

The proportion of the organic compound having a functional group is preferably 1 to 80 parts per hundred parts of resin (just abbreviated as 'phr', hereinafter) more preferably 2 to 70 phr of the at least one of a polyolefin resin having a functional group and a polyamide resin (component A).

The impact modifier is not specifically limited, however, examples thereof include rubbers such as an ethylene-propylene-diene rubber (EPDM), an ethylene-propylene rubber (EPM) and a hydrogenated acrylonitrile-butadiene rubber (H-NBR); and thermoplastic elastomers or themoplastic such as EGMA, modified EGMA, SBS, acid-modified SBS, SEBS, epoxidized SEBS, SIBS, acid-modified SEBS and polybutene; and resins, which may be used either alone or in combination.

The proportion of the impact modifier is preferably 1 to 80 phr, more preferably 2 to 70 phr of the at least one of a polyolefin resin having a functional group and a polyamide resin (component A).

As a material for forming the low fuel permeability layer 2 formed on an outer peripheral surface of the inner layer 1, the PPS resin (component B) is used. The PPS resin (component B) is not specifically limited as long as it has a structural unit represented by the following general formula (1).

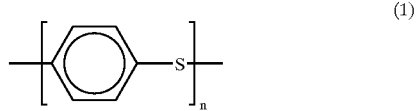

(1)

Wherein n is a positive number.

The PPS resin (component B) may include a functional group in its molecular structure (including a molecular terminal end). The functional group is not specifically limited, however, preferable examples thereof include an epoxy group, a hydroxyl group, a carboxylic anhydride residual group, a carboxylic acid group, an acrylate group, a carbonate group and an amino group.

One or more of an organic compound having a functional group and an impact modifier may be blended, as required, with the PPS resin (component B), as the material for the low fuel permeability layer 2. Examples of the organic compound having a functional group and the impact modifier may be the same as the aforementioned examples.

The proportion of the organic compound having a functional group is preferably 1 to 80 phr, more preferably 2 to 70 phr of the PPS resin (component B).

The proportion of the impact modifier is preferably 1 to 80 phr, more preferably 2 to 70 phr of the PPS resin (component B).

As a material for forming an outer layer 3 formed on an outer peripheral surface of the low fuel permeability layer 2, may preferably be the same as that of the inner layer 1. As the material for forming an outer layer 3, the at least one of a polyolefin resin having a functional group and a polyamide resin (component A) may be used, and may not be necessarily the same material as that of the inner layer 1. For example, it is acceptable that the material for forming an inner layer 1 is a polyamide resin and the material for forming an outer layer 3 is a polyolefin resin having a functional group. Alternatively, it is acceptable that the material for forming an inner layer 1 is a polyolefin resin having a functional group and the material for forming an outer layer 3 is a polyamide resin.

The inventive automotive fuel hose shown in the FIGURE is produced, for example, by the following process. First, each material is prepared for an inner layer 1, a low fuel permeability layer 2 and an outer layer 3, respectively. Each material is extruded by means of an inner-layer material extruder, a low fuel permeability material extruder and an outer-layer material extruder, respectively, and is combined in a die. The thus molten material is co-extruded into a tubular shape, which is passed through a sizing die, so that the intended fuel hose, wherein the low fuel permeability layer 2 is laminated onto an outer peripheral surface of the inner layer 1 and further the outer layer 3 is laminated onto an outer peripheral surface of the low fuel permeability layer, is produced. When forming the inventive hose into a corrugated shape, the thus molten material is passed through a corrugating mold (corrugation forming machine) so as to be formed into a corrugated hose having specific dimensions.

Alternatively, the thus obtained hose may be annealed (heat-treated) at specific conditions (for example, at 130° C. for one hour) by putting thereof into a thermally aging bath. It is preferred to anneal the thus obtained hose in this way, because the PPS resin has increased crystallinity and thus has improved low fuel permeability.

The structure of the inventive hose may not be specifically limited to a three-layer structure, as shown in the FIGURE. An innermost layer may be formed on an inner peripheral surface of the inner layer 1. Further, the inner layer 1 and the outer layer 3 each are not specifically limited to a single-layer structure. The inner layer 1 and the outer layer 3 each may have a two-layer structure or a multi-layer structure, wherein each type of the functional group may be different and each amount of the functional group, impact modifier, a plasticizer and the like may be different between the two or more sublayers. For example, when the outer layer 3 has a two-layer structure, wherein an inner sublayer comprises polyamide 12 with many amino groups and an outer sublayer comprises a polyamide resin with a few amino groups, cost can be reduced.

The material for the innermost layer is not specifically limited. For example, a fluororesin having a functional group is preferably employed.

The fluororesin having a functional group is not specifically limited, but examples thereof include an ethylene-tetrafluoroethylene copolymer (ETFE); a vinylidene fluoride-tetrafluoroethylene-hexafluoropropylene copolymer (THV); polyvinyl fluoride (PVF); polyvinylidene fluoride (PVDF); a tetrafluoroethylene-hexafluoropropylene copolymer (FEP); a tetrafluoroethylene-perfluoroalkylvinyl ether copolymer (PFA); polychlorotrifluoroethylene (CTFE); an ethylene-chlorotrifluoroethylene copolymer (ECTFE); a vinylidene fluoride-hexafluoropropylene copolymer; a hexafluoropropylene-perfluoroalkylvinyl ether copolymer; a vinylidene fluoride-perfluoroalkylvinyl ether copolymer; a tetrafluoroethylene-hexafluoropropylene-perfluoroalkylvinyl ether copolymer; an ethylene-tetrafluoroethylene-hexafluoropropylene copolymer; a vinylidene fluoride-tetrafluoroethylene-perfluoroalkylvinyl ether copolymer; a vinylidene fluoride-hexafluoropropylene-perfluoroalkylvinyl ether copolymer; a vinylidene fluoride-tetrafluoroethylene-hexafluoropropylene-perfluoroalkylvinyl ether copolymer; an ethylene-tetrafluoroethylene-perfluoroalkylvinyl ether copolymer; an ethylene-hexafluoropropylene-perfluoroalkylvinyl ether copolymer; an ethylene-tetrafluoroethylene-hexafluoropropylene-perfluoroalkylvinyl ether copolymer; a vinylidene fluoride-chlorotrifluoroethylene copolymer; and a vinylidene fluoride-tetrafluoroethylene copolymer. These fluororesins may be used either alone or in combination. Since a vinylidene fluoride-chlorotrifluoroethylene copolymer and an ethylene-tetrafluoroethylene-hexafluoropropylene copolymer are excellent in flexibility among them, bending formability can be improved. Further, since barrier properties and flexibility are improved, FEP, PFA, THV, a tetrafluoroethylene-hexafluoropropylene-perfluoroalkylvinyl ether copolymer and an ethylene-tetrafluoroethylene-hexafluoropropylene-perfluoroalkylvinyl ether copolymer are preferably used. Still further, ETFE, PVDF and THV are preferred because of their excellent processability.

The functional group of the fluororesin is not specifically limited, as long as it reacts directly with the polyamide resin or the functional group of the polyolefin resin, but preferable examples thereof include an epoxy group, a hydroxyl group, a carboxylic anhydride residual group, a carboxylic acid group, an acrylate group, a carbonate group, an amino group and a halogen group (chlorine, bromine and iodine) except for fluorine.

The fluororesin having the functional group may be obtained, for example, by grafting a graft compound having a functional group into the fluororesin or copolymerizing a compound having a functional group into a main chain or a terminal of the fluororesin.

As the innermost layer material, an electrically conductive agent may be added to the fluororesin having the functional group. Examples of the electrically conductive agent may be the same as the aforementioned examples.

When forming an innermost layer on an inner peripheral surface of the inner layer 1, each material is extruded by means of an innermost-layer material extruder, an inner-layer material extruder, a low fuel permeability material extruder and an outer-layer material extruder, respectively, and is combined in a die. The thus molten material is co-extruded into a tubular shape, which is passed through a sizing die, so that the intended fuel hose having a four-layer structure is produced.

Further, in the inventive automotive fuel hose, an intermediate layer may be formed on an inner peripheral surface of the inner layer 1 and the innermost layer may be formed on an inner peripheral surface of the intermediate layer.

The material for forming the intermediate layer is not specifically limited, however, preferable examples include a fluororesin having a functional group. The fluororesin having a functional group may be the same as the aforementioned examples.

The material for forming the innermost layer formed on an inner peripheral surface of the intermediate layer is not specifically limited, however, preferable examples include a mixture of a fluororesin and an electrically conductive agent. The fluororesin and the electrically conductive agent may be the same as the aforementioned examples, respectively.

When forming an intermediate layer and an innermost layer on an inner peripheral surface of the inner layer 1, each material is extruded by means of an innermost-layer material extruder, an intermediate-layer material extruder, an inner-layer material extruder, a low fuel permeability material extruder and an outer-layer material extruder, respectively, and is combined in a die. The thus molten material is co-extruded into a tubular shape, which is passed through a sizing die, so that the intended fuel hose having a five-layer structure is produced. Further, after forming a tube by extruding materials except for the outer layer material, the outer layer 3 may be formed by extruding the outer layer material so as to cover the thus formed tube as a mandrel.

An outermost layer may be provided on an outer peripheral surface of the outer layer 3 in consideration of providing flexibility suitable for hoses as well as chipping resistance.

The material for the outermost layer is not specifically limited, but examples thereof include polyamide resins, polyolefin resins and thermoplastic elastomers and rubbers, which may be used either alone or in combination. Further, it is possible to use materials imparted with properties such as flame retardancy, wear resistance, frictional property, anti-chipping property and/or grounding property.

When forming an outermost layer on an outer peripheral surface of the outer layer 3, each material is extruded by means of an inner-layer material extruder, a low fuel permeability material extruder, an outer-layer material extruder and an outermost-layer material extruder, respectively, and is combined in a die. The thus molten material co-extruded into a tube, which is passed through a sizing die, so that the intended fuel hose having a four-layer structure is produced. Further, the outermost layer is not limited to a single layer structure and may be a multi-layer structure having two or more layers. When the outermost layer has a two-layer structure, each material is extruded by means of an extruder for an inner sublayer of the outermost layer and an extruder for an outer sublayer of the outermost layer, and is combined in a die for forming such a two-layer structure. Further, the outermost layer having a two-layer structure may be formed by extruding each material for an inner sublayer and an outer sublayer thereof in tandem on the thus formed tube as a mandrel.

The inventive automotive fuel hose thus produced preferably has an inner diameter of 2 to 40 mm, particularly preferably 2.5 to 36 mm, and an outer diameter of 3 to 44 mm, particularly preferably 4 to 40 mm. The inner layer 1 preferably has a thickness of 0.02 to 1.0 mm, particularly preferably 0.05 to 0.6 mm. The low fuel permeability layer 2 preferably has a thickness of 0.02 to 0.8 mm, particularly-preferably 0.05 to 0.6 mm. Further, the outer layer 3 preferably has a thickness of 0.2 to 1.5 mm, particularly preferably 0.3 to 1.0 mm.

The inventive automotive fuel hose may preferably be used as a transportation hose for automotive fuel such as gasoline, alcohol-containing gasoline, diesel fuel, compressed natural gas (CNG), liquefied petroleum gas (LPG), but is not limited thereto. The inventive automotive fuel hose may be used as a transportation hose for methanol, hydrogen, dimethyl ether (DME) or the like for applications such as for vehicles, and a transportation hose such as an air-conditioner hose for transporting refrigerant (or coolant).

It is preferred that the inventive automotive fuel hose has an impact resistance of not less than 1.3 J at −40° C. Such an impact resistance can be measured in conformity with JASO (Japanese Automobile Standards Organization) M317.

Next, an explanation will be given to the Examples and the Comparative Examples.

Prior to the explanation of the Examples and the Comparative Examples, the ingredients employed therein were prepared.

PA11

BESN O P20 TL, available from ATOFINA Japan K,K, of Tokyo, Japan

PA12

UBESTA 3030J16L available from Ube Industries, Ltd. of Tokyo, Japan

Maleic Anhydride-Modified PP (Polypropylene)

ADMER QB550 available from Mitsui Chemicals of Tokyo, Japan

Carboxylic Anhydride-Modified ETFE

Fluon AH-2000 available from Asahi Glass Co., Ltd. of Tokyo Japan.

Electrically Conductive Carboxylic Anhydride-Modified ETFE

Fluon AH-3000 available from Asahi Glass Co., Ltd. of Tokyo Japan.

Electrically Conductive ETFE

Fluon CB-4C15L available from Asahi Glass Co., Ltd. of Tokyo, Japan

Epoxy-Modified THV

Epoxy-modified THV was prepared by blending 4 phr of glycidyl methacrylate and 2 phr of dicumyl peroxide to THV and kneading the resulting mixture by means of a twin screw extruder.

Electrically Conductive Modified FEP

Electrically conductive modified FEP was prepared by blending 1 phr of maleic anhydride and 2 phr of dicumyl peroxide to FEP, kneading the resulting mixture by means of a twin screw extruder, adding 15 phr of acetylene black thereto, mixing the resulting mixture sufficiently, and kneading the resulting mixture by means of a twin screw extruder to be pelletized.

Electrically Conductive Modified PFA

Electrically conductive modified PFA was prepared by blending 1 phr of maleic anhydride and 2 phr of dicumyl peroxide to PFA, kneading the resulting mixture by means of a twin screw extruder, adding 15 phr of acetylene black thereto, mixing the resulting mixture sufficiently, and kneading the resulting mixture by means of a twin screw extruder to be pelletized.

Copolymer of Electrically Conductive Modified TFE-Et-HFP-PMVE

A copolymer of electrically conductive modified TFE-Et-HFP-PMVE was prepared by adding 15 phr of acetylene black to a copolymer of tetrafluoroethylene (TFE)-ethylene (Et)-hexafluoropropylene (HFP)-perfluoromethylvinyl ether (PMVE) having a carbonyldioxy group, mixing the resulting mixture sufficiently, and kneading the resulting mixture by means of a twin screw extruder to be pelletized.

Copolymer of Electrically Conductive Modified TFE-HFP-PMVE

A copolymer of electrically conductive modified TFE-HFP-PMVE was prepared by adding 15 phr of acetylene black to a copolymer of tetrafluoroethylene (TFE)-hexafluoropropylene (HFP)-perfluoromethylvinyl ether (PMVE) having a carbonyldioxy group, mixing the resulting mixture sufficiently, and kneading the resulting mixture by means of a twin screw extruder to be pelletized.

Electrically Conductive Modified THV

Electrically conductive modified THV was prepared by blending 1 phr of maleic anhydride and 2 phr of dicumyl peroxide to THV (THV800 available from Dyneon, Ala. of the US), kneading the resulting mixture by means of a twin screw extruder, adding 15 phr of acetylene black thereto, mixing the resulting mixture sufficiently, and kneading the resulting mixture by means of a twin screw extruder to be pelletized.

Electrically Conductive Modified ethylene(Et)-tetrafluoroethylene (TFE)-hexafluoropropylene (HFP) copolymer RP5000AS available from Daikin Industries, Ltd., Osaka of Japan Electrically Conductive VDF-CTFE Copolymer An Electrically conductive VDF-CTFE copolymer was obtained by adding 15 phr of acetylene black to a vinylidene fluoride (VDF)-chlorotrifluoroethylene (CTFE) copolymer (KF polymer T #2300 available from Kureha Chemical Industry Co., Ltd. of Tokyo, Japan), mixing the resulting mixture sufficiently, and kneading the resulting mixture by means of a twin screw extruder to be pelletized.

PPS-1

PPS-1 was obtained by adding 1 phr of maleic anhydride to PPS (FZ-2200-A5 available from DAINIPPON INK AND CHEMICALS, INC. of Tokyo, Japan), mixing the resulting mixture sufficiently, and kneading the resulting mixture by means of a twin screw extruder at 290° C. to 320° C. to be pelletized.

PPS-2

PPS-2 was obtained by adding 15 phr of maleic anhydride modified EPDM to PPS (LD10 available from DAINIPPON INK AND CHEMICALS, INC. of Tokyo, Japan), mixing the resulting mixture sufficiently, and kneading the resulting mixture by means of a twin screw extruder at 290° C. to 320° C. to be pelletized.

PPS-3

PPS-3 was obtained by adding 20 phr of EGMA to PPS (FZ-2200-A5 available from DAINIPPON INK AND CHEMICALS, INC. of Tokyo, Japan), mixing the resulting mixture sufficiently, and kneading the resulting mixture by means of a twin screw extruder at 290° C. to 320° C. to be pelletized.

PPS-4

PPS-4 was obtained by adding 15 phr of acetylene black to the above-mentioned PPS-1, mixing the resulting mixture sufficiently, and kneading the resulting mixture by means of a twin screw extruder at 290° C. to 320° C. to be pelletized.

PPS-5

PPS-5 was obtained by adding 5 phr of a styrene-isopropenyloxazoline copolymer to PPS (FZ-2200-A5 available from DAINIPPON INK AND CHEMICALS, INC. of Tokyo, Japan), mixing the resulting mixture sufficiently, and kneading the resulting mixture by means of a twin screw extruder at 290° C. to 320° C. to be pelletized.

PPS-6

PPS-6 was obtained by adding 50 phr of maleic anhydride modified EPDM to PPS (LD10 available from DAINIPPON INK AND CHEMICALS, INC. of Tokyo, Japan), mixing the resulting mixture sufficiently, and kneading the resulting mixture by means of a twin screw extruder at 290° C. to 320° C. to be pelletized.

PPS-7

PPS-7 was obtained by adding 5 phr of a styrene-isopropenyloxazoline copolymer to PPS6, mixing the resulting mixture sufficiently, and kneading the resulting mixture by means of a twin screw extruder at 290° C. to 320° C. to be pelletized.

EXAMPLE 1

Each extruder for an inner layer, a low fuel permeability layer and an outer layer was prepared, respectively. Each material was extruded by each extruder, and was combined in a die, and then passed through a sizing die for obtaining an automotive fuel hose having an inner layer, a low fuel permeability layer and an outer layer laminated successively in this order, and having an inner diameter of 6 mm and an outer diameter of 8 mm. Successively, the thus obtained hose was annealed at 130° C. for one hour by putting thereof into a thermally aging bath.

EXAMPLES 2 TO 22 AND COMPARATIVE EXAMPLES 1 AND 2

Fuel hoses were produced in substantially the same manner as in Example 1, except that materials for an innermost layer, an intermediate layer, an inner layer, a low fuel permeability layer and an outer layer shown in Tables 1 to 3 were employed. Example 3 was not annealed.

The properties of the fuel hoses of Examples and Comparative Examples were evaluated in the following manner. The results are also shown in Tables 1 to 3.

Gasoline Permeability

Opposite end portions of a 10 m long fuel hose (having an inner diameter of 6 mm) were each expanded to an inner diameter of 10 mm by means of a cone-shaped jig. Then, two metal pipes were prepared which each had an outer diameter of 8 mm with two bulged portions each having an outer diameter of 10 mm and with each one end thereof having a rounded outer periphery. These metal pipes were respectively press-fitted into opposite end portions of the hose. A blind cap was threadingly attached to one of the metal pipes, and a metal valve was attached to the other metal pipe. Thereafter, Indolene gasoline (containing 10 vol % ethanol) was supplied into the fuel hose through the metal valve, and the fuel hose was sealed. The fuel hose was allowed to stand at 40° C. for 3000 hours (the Indolene gasoline containing 10 vol % ethanol was changed every week). Then, fuel permeation was measured for three days on the basis of a Diurnal Breathing Loss (DBL) pattern by the Sealed Housing for Evaporative Detection (SHED) method in accordance with California Air Resources Board (CARB) Then, fuel permeation per meter of the hose was determined on a day when the maximum fuel permeation was detected. In Tables 1 to 3, the notation "<0.1" indicates that the measured fuel permeation was below the measurement limitation (0.1 mg/m/day) of the aforesaid measurement method.

Sour Gasoline Resistance

A model of degraded (sour) gasoline was prepared by blending 5 wt % of dilauroyl peroxide (LPO) in Fuel C (50 vol % of toluene+50 vol % isooctane). Then, two metal pipes were respectively press-fitted into opposite end portions of a 10 m long fuel hose. After the model of degraded gasoline was circulated through the fuel hose at 60° C. at a pressure of 0.3 MPa for eight hours via a pressure regulator, the model of degraded gasoline was filled in the fuel hose for 16 hours. After this cycle was repeated 30 times, a part of the fuel hose was sampled and bent by 180 degrees. The state of the sampled part was visually observed for the evaluation of the sour gasoline resistance. In Tables 1 to 3, the symbol ○ indicates that no cracking was observed on both inner and outer sides of each fuel hose, and the symbol × indicates that either or both sides of the fuel hose was cracked.

Adhesion

The fuel hoses were each longitudinally cut into four strips. By using one of the strips, a peel force (N/cm) required for separating the low fuel permeability layer from its internal layer was determined. As for Comparative Example 1, a peel force (N/cm) required for separating a layer comprising a PPS resin (an inner layer) from its external layer comprising PA12 was determined in the same manner as described above.

Impact Resistance

After each fuel hose was allowed to stand at −40° C. for 4 hours, a drop-weight test was conducted in conformity with JASO M317 in such a manner that a falling weight (round rod having a diameter of 32 mm and 450 g and both ends thereof with 16 mm radius of curvature, respectively) was dropped from the height of 305 mm onto each fuel hose. Then, each hose was cut into halves longitudinally, and occurrence of abnormality was visually evaluated on both inner and outer sides of each fuel hose. In Tables 1 to 3, the symbol ○ indicates that no cracking was observed on both sides of the fuel hose as impact resistance of not less than 1.3 J, and the symbol × indicates that either or both sides of the fuel hose was cracked as impact resistance of less than 1.3 J.

Bending Strength

Each bending strength required for a deformation of 10 mm was measured by using each fuel hose in a three-point bending test in which distance between the supports is 100 mm and a test speed is 100 mm/min. The bending strength is an index for bending formability. The smaller the bending strength is, the easier bending molding is due to its flexibility.

TABLE 1

| | EXAMPLE | | | | | | | |
|---|---|---|---|---|---|---|---|---|
| | 1 | 2 | 3 | 4 | 5 | 6 | 7 | 8 |
| Innermost layer | — | — | — | — | — | — | Carboxylic anhydride-modified ETFE | Electrically conductive carboxylic anhydride-modified ETFE |
| Inner layer | PA11 | PA12 | PA12 | PA12 | PA12 | Maleic anhydride-modified PP | PA12 | PA12 |
| Low fuel permeability layer | PPS-1 | PPS-1 | PPS-1 | PPS-2 | PPS-1 | PPS-1 | PPS-1 | PPS-1 |
| Outer layer | PA12 | PA12 | PA12 | PA12 | Maleic anhydride-modified PP | Maleic anhydride-modified PP | PA12 | PA12 |
| Thickness (μm) | | | | | | | | |
| Innermost layer | — | — | — | — | — | — | 50 | 50 |
| Inner layer | 400 | 400 | 400 | 400 | 400 | 400 | 350 | 350 |
| Low fuel permeability layer | 200 | 200 | 200 | 200 | 200 | 200 | 200 | 200 |
| Outer layer | 400 | 400 | 400 | 400 | 400 | 400 | 400 | 400 |
| Annealing treatment | Yes | Yes | No | Yes | Yes | Yes | Yes | Yes |
| Gasoline permeability | <0.1 | <0.1 | <0.1 | <0.1 | <0.1 | <0.1 | <0.1 | <0.1 |

TABLE 1-continued

|  | EXAMPLE | | | | | | | |
|---|---|---|---|---|---|---|---|---|
|  | 1 | 2 | 3 | 4 | 5 | 6 | 7 | 8 |
| (mg/m/day) | | | | | | | | |
| Sour gasoline resistance | ◯ | ◯ | ◯ | ◯ | ◯ | ◯ | ◯ | ◯ |
| Adhesion (N/cm) | 25 | 34 | 34 | 32 | 34 | 31 | 34 | 33 |
| Impact resistance | ◯ | ◯ | ◯ | ◯ | ◯ | ◯ | ◯ | ◯ |
| Bending strength (N) | 51 | 50 | 47 | 45 | 57 | 63 | 51 | 52 |

TABLE 2

|  | EXAMPLE | | | | | | | |
|---|---|---|---|---|---|---|---|---|
|  | 9 | 10 | 11 | 12 | 13 | 14 | 15 | 16 |
| Innermost layer | Electrically conductive carboxylic anhydride-modified ETFE | Electrically conductive carboxylic anhydride-modified ETFE | Electrically conductive carboxylic anhydride-modified ETFE | Electrically conductive ETFE | Epoxy-modified THV | Electrically conductive carboxylic anhydride-modified ETFE | Electrically conductive modified FEP | Electrically conductive modified PFA |
| Intermediate layer | — | — | — | carboxylic anhydride-modified ETFE | — | — | — | — |
| Inner layer | PA12 | PA12 | PA12 | PA12 | PA12 | PA12 | PA12 | PA12 |
| Low fuel permeability layer | PPS-2 | PPS-2 | PPS-3 | PPS-1 | PPS-1 | PPS-5 | PPS-6 | PPS-6 |
| Outer layer | PA12 | PA12 | PA12 | PA12 | PA12 | PA12 | PA12 | PA12 |
| Thickness (μm) | | | | | | | | |
| Innermost layer | 50 | 50 | 50 | 50 | 50 | 50 | 50 | 50 |
| Intermediate layer | — | — | — | 100 | — | — | — | — |
| Inner layer | 350 | 400 | 350 | 250 | 350 | 350 | 100 | 100 |
| Low fuel permeability layer | 200 | 100 | 200 | 200 | 200 | 200 | 100 | 100 |
| Outer layer | 400 | 450 | 400 | 400 | 400 | 400 | 750 | 750 |
| Annealing treatment | Yes | Yes | Yes | Yes | Yes | Yes | Yes | Yes |
| Gasoline permeability (mg/m/day) | <0.1 | <0.1 | <0.1 | <0.1 | <0.1 | <0.1 | <0.1 | <0.1 |
| Sour gasoline resistance | ◯ | ◯ | ◯ | ◯ | ◯ | ◯ | ◯ | ◯ |
| Adhesion (N/cm) | 31 | 31 | 30 | 35 | 33 | 35 | 31 | 32 |
| Impact resistance | ◯ | ◯ | ◯ | ◯ | ◯ | ◯ | ◯ | ◯ |
| Bending strength (N) | 48 | 40 | 48 | 53 | 51 | 52 | 32 | 30 |

TABLE 3

|  | EXAMPLE | | | | | | COMPARATIVE EXAMPLE | |
|---|---|---|---|---|---|---|---|---|
|  | 17 | 18 | 19 | 20 | 21 | 22 | 1 | 2 |
| Innermost layer | Electrically conductive modified TFE/Et/HFP/PMVE copolymer | Electrically conductive modified TFE/HFP/PMVE copolymer | Electrically conductive modified THV | Electrically conductive modified TFE/HFP/PMVE copolymer | Electrically conductive modified Et/TFE/HFP copolymer | Electrically conductive modified VDF/CTFE copolymer | — | — |
| Inner layer | PA12 | PA12 | PA12 | PA12 | PA12 | PA12 | PPS-4 | PA12 |
| Low fuel permeability layer | PPS-6 | PPS-6 | PPS-6 | PPS-7 | PPS-6 | PPS-6 | — | — |
| Outer layer | PA12 | PA12 | PA12 | PA12 | PA12 | PA12 | PA12 | — |
| Thickness (μm) | | | | | | | | |
| Innermost layer | 50 | 50 | 50 | 50 | 50 | 50 | — | — |
| Inner layer | 100 | 100 | 100 | 100 | 100 | 100 | 200 | 1000 |
| Low fuel permeability layer | 100 | 100 | 100 | 100 | 200 | 200 | — | — |
| Outer layer | 750 | 750 | 750 | 750 | 650 | 650 | 800 | — |
| Annealing treatment | Yes | Yes | Yes | Yes | Yes | Yes | Yes | Yes |

TABLE 3-continued

| | EXAMPLE | | | | | | COMPARATIVE EXAMPLE | |
|---|---|---|---|---|---|---|---|---|
| | 17 | 18 | 19 | 20 | 21 | 22 | 1 | 2 |
| Gasoline permeability (mg/m/day) | <0.1 | <0.1 | <0.1 | <0.1 | <0.1 | <0.1 | 230 | 2500 |
| Sour gasoline resistance | ○ | ○ | ○ | ○ | ○ | ○ | X | ○ |
| Adhesion (N/cm) | 35 | 34 | 31 | 36 | 34 | 35 | 33 | — |
| Impact resistance | ○ | ○ | ○ | ○ | ○ | ○ | X | ○ |
| Bending strength (N) | 30 | 31 | 31 | 31 | 36 | 37 | 44 | 22 |

As can be understood from the results, the fuel hoses of the Examples had low fuel permeability, and had excellent sour gasoline resistance, adhesion and impact resistance. Especially, since Examples 21 and 22 used a fluororesin, more flexible than ETFE, as a material for forming the innermost layer, the bending strength was small. Further, each fuel hose of Examples 15 to 20 had a sufficient barrier property because a flexible and low-fuel permeable fluororesin with fluorine content higher than that of ETFE was used as a material for forming an innermost layer if the thickness of the low fuel permeability layer was reduced to 100 μm. For this reason, the bending strength was further reduced and the bending formability was excellent.

On the other hand, the fuel hose of Comparative Example 1, in which the inner layer formed by the PPS was in direct contact with sour gasoline, was inferior in sour gasoline resistance. Further, since the inner layer formed by the PPS was exposed, the hose of Comparative Example 1 was inferior in impact resistance. The fuel hose of Comparative Example 2, having a single layer structure formed by a polyamide resin, had much gasoline permeate flow and was remarkably inferior in low fuel permeability.

What is claimed is:

1. An automotive fuel hose having a three-layer structure which comprises:
   a tubular inner layer in which fuel is adapted to flow;
   a low fuel permeability layer formed on an outer peripheral surface of the inner layer; and
   an outer layer formed on an outer peripheral surface of the low fuel permeability layer,
   the inner layer and the outer layer each comprising at least one of a polyolefin resin having a functional group and a polyamide resin and the low fuel permeability layer comprising a polyphenylene sulfide resin.

2. An automotive fuel hose as set forth in claim 1, wherein the polyphenylene sulfide resin has a functional group.

3. An automotive fuel hose as set forth in claim 1, wherein the low fuel permeability layer further comprises an organic compound having a functional group.

4. An automotive fuel hose as set forth in claim 1, further comprising an innermost layer formed on an inner peripheral surface of the inner layer, the innermost layer comprising a fluororesin having a functional group.

5. An automotive fuel hose as set forth in claim 4, wherein the innermost layer further comprises an electrically conductive agent.

6. An automotive fuel hose as set forth in claim 1, further comprising a intermediate layer formed on an inner peripheral surface of the inner layer and an innermost layer formed on an inner peripheral surface of the intermediate layer, the intermediate layer comprising a fluororesin having a functional group and the innermost layer comprising a fluororesin and an electrically conductive agent.

7. An automotive fuel hose as set forth in claim 2, wherein the functional group of the polyphenylene sulfide resin is at least one functional group selected from the group consisting of an epoxy group, a hydroxyl group, a carboxylic anhydride residual group, a carboxylic acid group, an acrylate group, a carbonate group and an amino group.

8. An automotive fuel hose as set forth in claim 4, wherein the functional group of the fluororesin is at least one functional group selected from the group consisting of an epoxy group, a hydroxyl group, a carboxylic anhydride residual group, a carboxylic acid group, an acrylate group, a carbonate group, an amino group and a halogen group.

9. An automotive fuel hose as set forth in claim 1, wherein the low fuel permeability layer further comprises impact modifier.

10. An automotive fuel hose as set forth in claim 1, wherein annealing treatment is conducted.

11. An automotive fuel hose as set forth in claim 4, wherein the innermost layer comprises at least one copolymer selected from the group consisting of a tetrafluoroethylene-hexafluoropropylene copolymer (FEP) having a functional group, a vinylidene fluoride-tetrafluoroethylene-hexafluoropropylene copolymer (THV) having a functional group, a tetrafluoroethylene-perfluoroalkylvinyl ether copolymer (PFA) having a functional group, a tetrafluoroethylene-hexafluoropropylene-perfluoroalkylvinyl ether copolymer having a functional group, an ethylene-tetrafluoroethylene-hexafluoropropylene-perfluoroalkylvinyl ether copolymer having a functional group, a vinylidene fluoride-chlorotrifluoroethylene copolymer and an ethylene-tetrafluoroethylene-hexafluoropropylene copolymer having a functional group.

* * * * *